Figure 1:
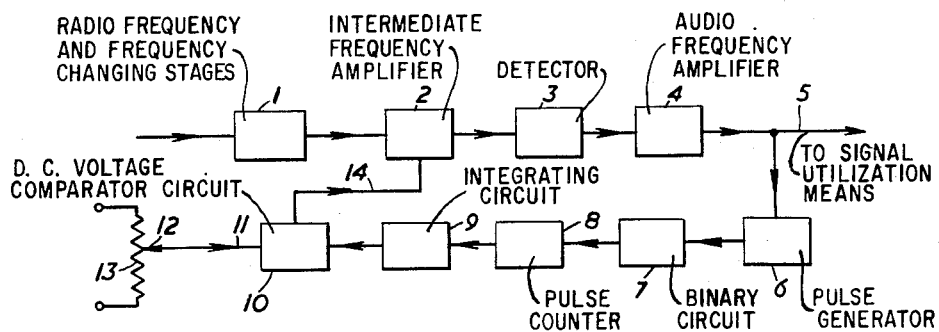

# United States Patent Office 3,262,057
Patented July 19, 1966

---

3,262,057
GAIN CONTROL SYSTEMS
William Francis Miller, Great Baddow, and Frank Colston Bennett, Little Baddow, England, assignors to The Marconi Company Limited, a company of London
Filed Jan. 11, 1961, Ser. No. 82,124
Claims priority, application Great Britain, Jan. 11, 1960, 915/60
2 Claims. (Cl. 325—305)

This invention relates to gain control systems and has for its object to provide improved systems for facilitating or, if desired, automatically controlling the gain of radio and other receivers intended and adapted for the reception of signals which are present for only a relatively small part of the time.

There are certain cases in which receivers are required to be ready to receive signals of the nature of pulse signals which are present for only a relatively small part of the time and to have a required predetermined gain for such signals when they come in. Examples of this requirement are receivers for receiving signals from radar jamming transmitters or other pulse transmitters, or for receiving radar echo signals. Thus, in a radar watching system there may be a very large number of receivers—perhaps running into hundreds or even thousands—which are required to be in a state of watchfulness ready to receive pulse signals, such as radar echo signals or radar jamming pulses and it may be a requirement that all the receivers shall continuously present a known predetermined gain so that, when a signal is received by any receiver, it shall be subjected to the same gain. A common requirement is that the product of gain and bandwidth shall be constant. Such a requirement arises, for example, in certain radar watching systems in which different receivers are used in co-operation to "fix" the position of a source of incoming signals being received. The present invention is advantageously applicable to such systems and to others in which the same gain from all of a number of receivers is required to be obtained, despite "drift" of the individual receivers in gain and may be used to give warning if the gain of any individual receiver departs from the required value, so that manual adjustment of gain may be readily made as necessary, or, where manual adjustment is inconvenient, undesirable or impracticable, the invention may be used to enable the gain of a receiver adapted to receive signals which are present for only a relatively small part of the time, to be automatically adjusted to a required value (which itself may be adjustable) before the signals come in.

According to this invention a gain responsive system for a receiver adapted and intended to receive signals which are present for only a relatively small part of the time comprises indicator and/or control means responsive to the number of noise peaks exceeding a predetermined amplitude and occurring in the receiver output over a predetermined unit of time. Indicator means, where provided, are arranged to give a warning indication if the number of noise peaks per unit of time exceeds a predetermined maximum or falls below a predetermined minimum. Control means, where provided, are arranged automatically to adjust the gain of the receiver to maintain said number of such peaks per unit of time substantially constant.

The preferred embodiments of the invention comprise means, responsive to noise peaks exceeding a predetermined amplitude and occurring in the receiver output, for generating pulses of a number per unit of time proportional to the number of such peaks occurring in that time, means for counting and integrating the generated pulses for producing a direct current potential dependent on the number of generated pulses per unit of time, means for comparing the produced direct current potential with a reference direct current potential (which may be adjustable) and means for utilising the resultant of comparison to operate indicator and/or control means to indicate (in the case of indicator means) departure of receiver gain from a predetermined value or (in the case of control means) to control the receiver gain to maintain the produced direct current potential in predetermined substantially fixed relationship with the reference direct current potential.

In one embodiment of the invention there is provided a pulse generator (such for example as a so-called Schmitt trigger circuit) fed from a low frequency point in a receiver and adapted to produce a pulse in response to each peak exceeding a predetermined amplitude and present at said point; a so-called binary stage fed from said generator; a pulse counter circuit fed from said binary stage; an integrator fed from the counter circuit and adapted to produce a direct current potential dependent on the number of pulses per unit time from the generator; a direct current voltage amplitude comparator; means for feeding said direct current potential as one input to said comparator; means for feeding a reference potential (which may be adjustable) as the other input to said comparator; and means for utilizing output from said comparator to operate indicator means and/or to act as automatic gain controlling potential for said receiver.

It will be seen that the invention in effect utilizes noise output, present when a receiver is not receiving signals, for indicating gain and/or securing automatic gain control. It takes advantage of the fact that, while the noise output of a receiver may be of Gaussian, Rayleigh, or (more probably) mixed Gaussian and Rayleigh distribution, the said distribution will be sensibly constant. Moreover, it is likely to be the same for all of a number of generally similar receivers. Accordingly the probability that the instantaneous noise amplitude output will exceed the root-mean-square value by a given factor will likewise be constant as also will be the number of times per unit of time that the peak noise exceeds a chosen threshold value. By taking advantage of this fact in the manner described, the desirable result is achieved that the required indication of receiver gain and/or automatic adjustment thereof is obtained actually before the signals are received. The invention is thus fundamentally different from all those known automatic gain control systems in which the gain controlling potential is derived in dependence upon signal (as distinct from noise) output. Of course, any incoming signals which exceed the predetermined noise peak amplitude will theoretically contribute to and affect the gain indication given or control exercised but, in the type of receiver with which the invention is concerned—that in which the signals only occupy a relatively small part of the time—such contribution will be in ordinary practice negligibly small and, from the practical point of view, the gain indication and/or control can be considered to be operated by noise.

Where a number of receivers are to be controlled in accordance with this invention to have the same gain, each may be provided with a similar automatic gain control system and a common source of reference potential may be used for all the systems.

Figure 2:
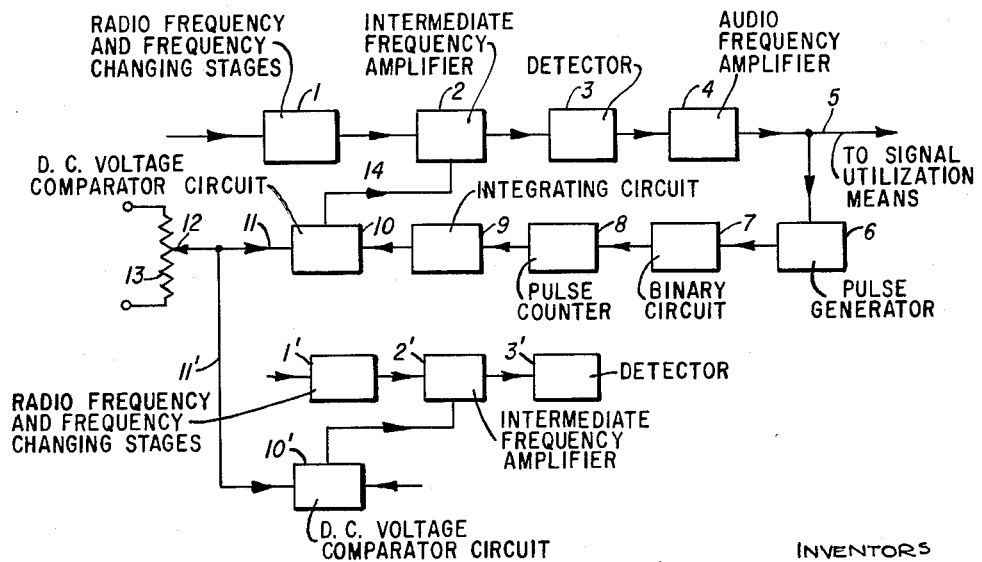

The invention is illustrated in the accompanying drawings, in which:

FIGURE 1 is a block diagram of one embodiment of the invention; and
FIGURE 2 is a block diagram showing how a plurality of receivers may be controlled by similar gain control systems associated with the same reference potential source to present the same gain.

Referring to FIGURE 1 of the drawing, the apparatus therein shown comprises radio frequency and frequency changing stages, represented by the block 1, of a radio receiver of the heterodyne type; an intermediate frequency amplifier 2; a detector 3; and an audio frequency amplifier 4 from which output is taken over load 5 to signal ultilization means not shown. The receiver as so far described is of well known form and requires no detailed description.

Output from the amplifier 4 is also taken to a Schmitt trigger circuit or similar pulse generator 6 which is adjusted and arranged in well known fashion to produce a pulse each time a peak voltage amplitude exceeding a predetermined value is fed to it from the amplifier 4. The threshold voltage value at which the trigger circuit 6 responds may be adjustable if desired.

Output pulses from the trigger circuit 6 are fed to any suitable known form of binary circuit 7 which in known manner converts the output pulses from the trigger circuit into a nominal 50/50 square wave signal. This square wave signal is converted into a direct current signal of value depending upon the frequency of the square wave by means of a known pulse counter 8 followed by a known integrating circuit 9. The D.C. output from the circuit 9 is fed as one input to a known direct current voltage comparator circuit 10 whose second input, fed to it over lead 11, is a reference direct current potential. This reference direct current potential is represented as obtained from the slider 12 on a potentiometer 13 to indicate that the reference potential may be adjustable. The resultant output from the comparator 10, which appears on lead 14 may be used, via a suitable relay system, to operate an indicator to indicate that the receiver has more (or less) than the predetermined required gain. As shown, however, the voltage on lead 14 is fed as a gain controlling potential automatically to control the gain of the amplifier 2 in any convenient well known manner.

Although the reference potential is, for simplicity of drawing shown as derived from a potentiometer (in conjunction with a direct current source, not shown) in practice a convenient way of obtaining the reference potential is by means of a generator of, for example, 25 c./s. normal frequency in conjunction with a rectifier, variation of the reference potential being obtained by varying the frequency of the generator.

In practice, the threshold level of the Schmitt trigger circuit 6 is preferably set at such value that in the absence of incoming signals to the receiver—i.e. under "noise only" conditions—the number of output pulses from the trigger circuit is about 50 per second resulting in a square wave of about 25 c./s. being fed to the pulse counter 8.

In cases in which it is required to control a number of receivers automatically to present the same gain, each receiver is provided with a similar gain control system and the same reference potential source could be used for all of them. This is indicated in FIGURE 2 in which a second receiver is indicated by a few of its parts—the parts 1', 2', 3', and 10' which correspond to the parts 1, 2, 3 and 10 respectively of the receiver already described—the reference potential input to the comparator 10' being fed to it over the lead 11'.

Where gain watching of a number of receivers is to be provided a satisfactory arrangement comprises a gain responsive system in accordance with this invention— for example a system consisting of the illustrated apparatus 6, 7, 8, 9, 10, 12 and 13 with an indicator operated by the voltage in lead 14; a sampling switch arranged cyclically to connect the input end of said system (input side of unit 6) to the output of each receiver in turn for a sufficient time to allow the integrating circuit 9 to operate, e.g. for 3½ secs. to quote a practical figure. The sampling switch may be of any known kind, e.g. motor driven, and continues stepping round the receiver outputs so long as all the receivers are within predetermined gain limits. If, however, any receiver shows itself, when its output is sampled in this way, to be of incorrect gain, the changed output on lead 14 not only operates via a suitable relay system, a warning indicator to warn an attendant, but also operates, through the same on other suitable relays, a control circuit to stop the sampling switch while it is still sampling the receiver of incorrect gain. The attendant then re-adjusts the gain of this receiver and when it is correct to his satisfaction, re-starts the sampling switch. An indicating system of this nature has been successfully employed experimentally to "watch" nearly 200 receivers.

We claim:

1. In combination, a plurality of receivers for receiving signals which are present for only a relatively small part of the time; and an automatic gain control system for maintaining the gain of the receivers substantially constant and the same, said system comprising means responsive to noise peaks exceeding a predetermined amplitude occurring in the receiver outputs for generating pulses of a number per unit of time proportional to the number of such peaks occurring in that time, means for counting and integrating the generated pulses for producing a direct current potential dependent on the number of generated pulses per unit of time, means providing reference direct current potential the same for each of said receivers, means for comparing the produced direct current potentials with said reference direct current potential, and means for utilizing the resultants of said comparing for automatically adjusting the gains of said receivers.

2. A combination according to claim 1 wherein said system includes, for each receiver, a separate means responsive to noise peaks exceding a predetermined amplitude, and separate means for generating, counting, integrating and producing the direct current potential dependent on the number of generated pulses per unit of time.

References Cited by the Examiner
UNITED STATES PATENTS

| | | | |
|---|---|---|---|
| 1,763,194 | 6/1930 | Sivian | 325—302 |
| 2,477,028 | 7/1949 | Wilkie | 343—205 X |
| 2,590,234 | 3/1952 | Coxhead | 325—302 |
| 2,851,596 | 9/1958 | Hilton | 328—136 |
| 2,857,594 | 10/1958 | Frank et al. | 250—20 X |
| 2,860,330 | 11/1958 | Giles | 343—17.1 |
| 2,887,654 | 5/1959 | Strassman et al. | 324—78 |
| 2,919,401 | 12/1959 | Cole et al. | 324—78 |

KATHLEEN H. CLAFFY, *Primary Examiner.*

CHESTER L. JUSTUS, *Examiner.*

R. S. BELL, *Assistant Examiner.*